(12) United States Patent
Stiebeiner et al.

(10) Patent No.: US 12,555,294 B2
(45) Date of Patent: Feb. 17, 2026

(54) SEGMENTATION OF COMPUTED TOMOGRAPHY VOXEL DATA USING MACHINE LEARNING

(71) Applicant: FARO Technologies, Inc., Lake Mary, FL (US)

(72) Inventors: Ariane Stiebeiner, Stuttgart (DE); Georgios Balatzis, Fellbach (DE); Vivek Vrujlal Vekariya, Stuttgart (DE)

(73) Assignee: FARO Technologies, Inc., Lake Mary, FL (US)

( * ) Notice: Subject to any disclaimer, the term of this patent is extended or adjusted under 35 U.S.C. 154(b) by 291 days.

(21) Appl. No.: 18/326,380

(22) Filed: May 31, 2023

(65) Prior Publication Data

US 2023/0394718 A1 Dec. 7, 2023

Related U.S. Application Data

(60) Provisional application No. 63/349,906, filed on Jun. 7, 2022, provisional application No. 63/347,726, filed on Jun. 1, 2022.

(51) Int. Cl.
*G06T 11/00* (2006.01)
*G06T 5/70* (2024.01)
*G06T 5/80* (2024.01)

(52) U.S. Cl.
CPC .......... *G06T 11/008* (2013.01); *G06T 5/70* (2024.01); *G06T 5/80* (2024.01); *G06T 2207/20084* (2013.01)

(58) Field of Classification Search
CPC . G06T 11/008; G06T 5/70; G06T 5/80; G06T 2207/20084; G06T 2207/10081; G06T 2207/20081; G06T 2207/30164; G06T 5/60; G06T 7/11
USPC .............................................. 382/100
See application file for complete search history.

(56) References Cited

U.S. PATENT DOCUMENTS

| | | | |
|---|---|---|---|
| 2019/0340763 A1* | 11/2019 | Laserson | G06T 9/00456 |
| 2019/0365341 A1* | 12/2019 | Chan et al. | A61B 6/5258 |
| 2022/0375038 A1* | 11/2022 | Nagare et al. | G06T 5/002 |
| 2023/0153949 A1* | 5/2023 | Huang et al. | |
| 2023/0206404 A1* | 6/2023 | Kobayashi | G06T 5/002 |
| 2025/0009483 A1* | 1/2025 | Ezhov et al. | A61C 9/0053 |
| 2025/0078215 A1* | 3/2025 | Bergner et al. | G06T 5/70 |

* cited by examiner

*Primary Examiner* — Matthew C Bella
*Assistant Examiner* — Daniel Joseph Santos
(74) *Attorney, Agent, or Firm* — McCarter & English, LLP; Dave S. Christensen

(57) ABSTRACT

Examples described herein provide a method that includes creating two-dimensional (2D) slices from a plurality of computed tomography (CT) voxel data sets. The method further includes adding artificial noise to the 2D slices to generate artificially noisy 2D slices. The method further includes creating patches from the 2D slices and the artificially noisy 2D slices. The method further includes training an autoencoder using the patches.

18 Claims, 14 Drawing Sheets

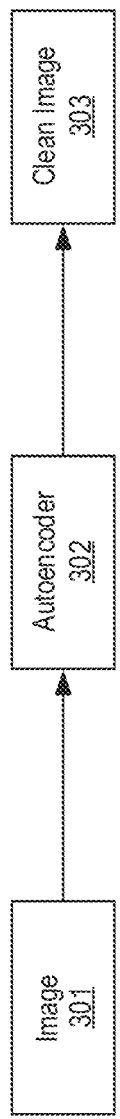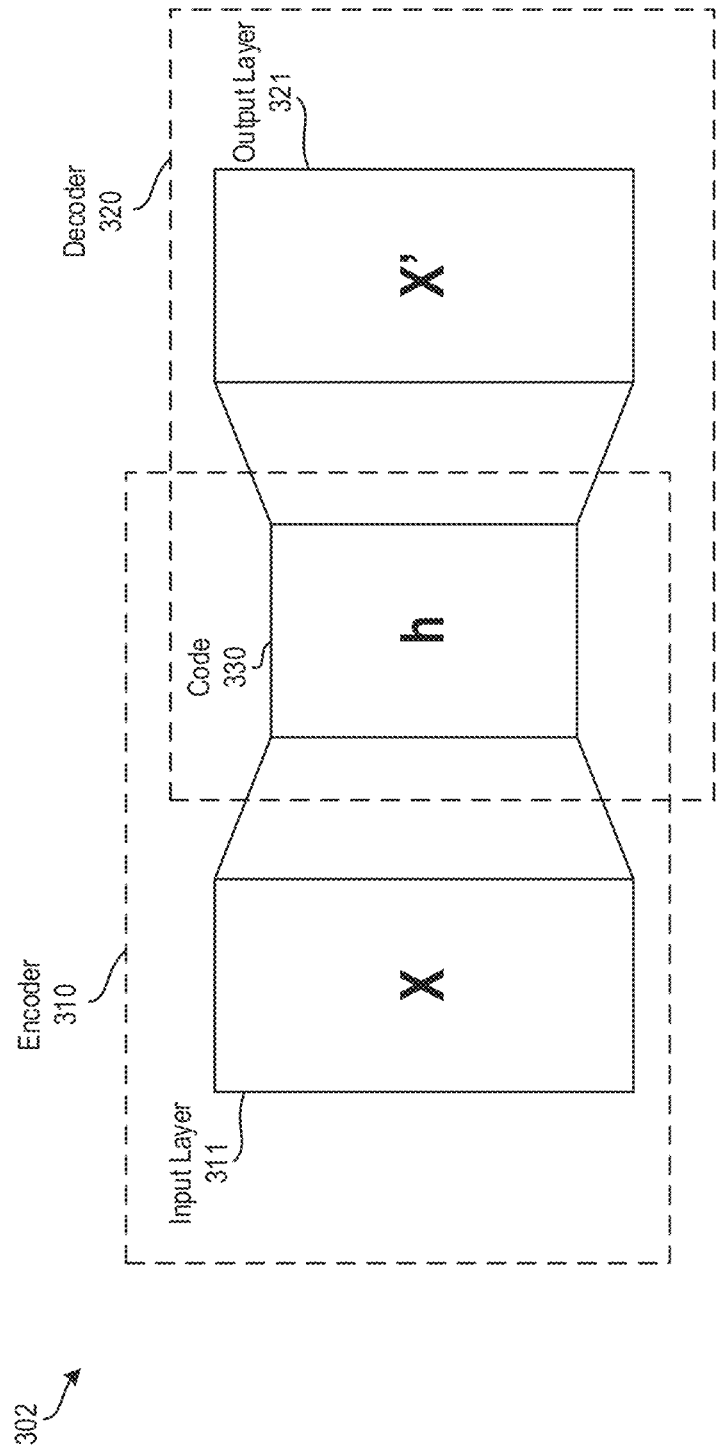

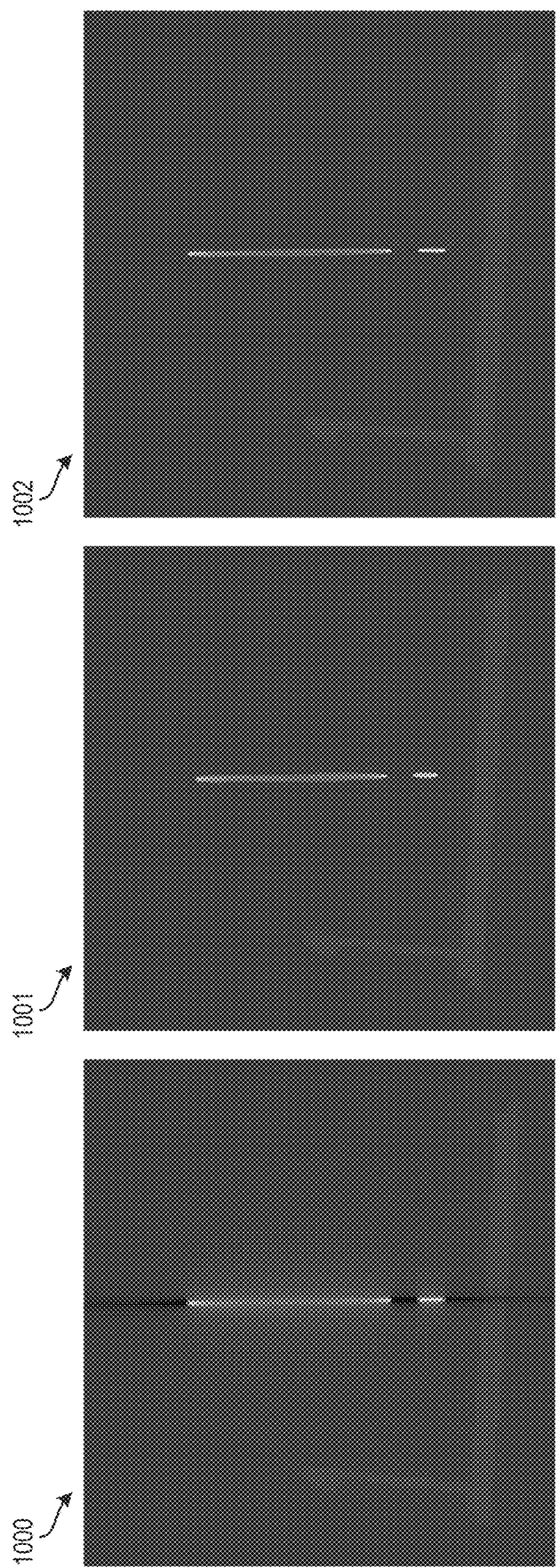
FIG. 10A Original scan data
FIG. 10B Artificially artefact-free data
FIG. 10C Network output

FIG. 11C Network output
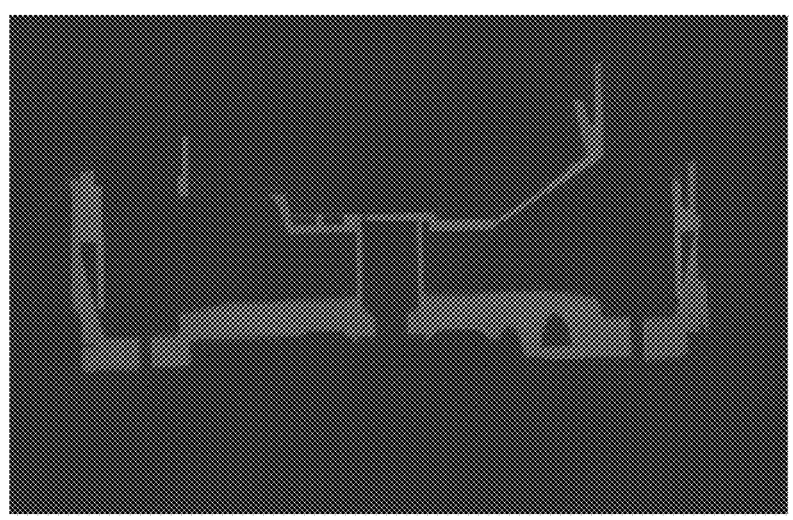
FIG. 11B Artificially artefact-free data
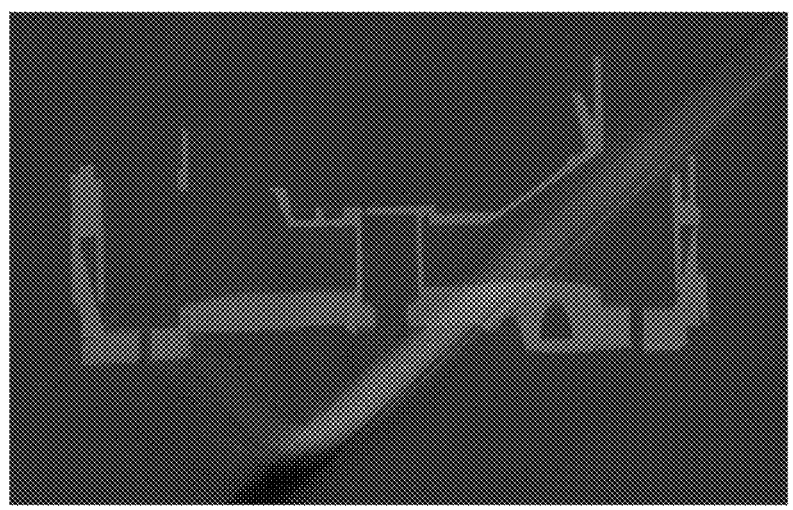
FIG. 11A Original scan data

SEGMENTATION OF COMPUTED TOMOGRAPHY VOXEL DATA USING MACHINE LEARNING

CROSS-REFERENCE TO RELATED APPLICATIONS

This application claims the benefit of U.S. Provisional Patent Application No. 63/347,726, entitled "SEGMENTATION OF COMPUTED TOMOGRAPHY VOXEL DATA USING MACHINE LEARNING" filed Jun. 1, 2022, which is incorporated by reference herein in its entirety. This application also claims the benefit of U.S. Provisional Patent Application No. 63/349,906, entitled "SEGMENTATION OF COMPUTED TOMOGRAPHY VOXEL DATA USING MACHINE LEARNING" filed Jun. 7, 2022, which is incorporated by reference herein in its entirety.

BACKGROUND

The subject matter disclosed herein relates to a computed tomography (CT) system and methods for inspecting objects, and in particular to a system and methods for segmentation of CT voxel data using machine learning.

CT systems provide a non-invasive means for inspecting objects. A CT system emits x-rays that pass into and through an object. The measurement of these x-rays allows the generation of 2D x-ray images of the object. In some systems, the objects are rotated in the scanner and imaged hundreds of time. These 2D images are combined together into a three-dimensional (3D) voxel (volumetric pixel) data set. From this voxel data set, a surface can be extracted and stored as a 3D point cloud. The 3D point cloud may be used to measure the object being inspected.

Accordingly, while existing CT inspection systems are suitable for their intended purposes, the need for improvement remains, particularly in providing a CT inspection system and method that improves segmentation and surface determination.

SUMMARY

In one exemplary embodiment, a method is provided. The method includes creating two-dimensional (2D) slices from a plurality of computed tomography (CT) voxel data sets. The method further includes adding artificial noise to the 2D slices to generate artificially noisy 2D slices. The method further includes creating patches from the 2D slices and the artificially noisy 2D slices. The method further includes training an autoencoder using the patches.

In addition to one or more of the features described herein, or as an alternative, further embodiments of the method may include, subsequent to creating the patches and prior to training the autoencoder, normalizing the patches.

In addition to one or more of the features described herein, or as an alternative, further embodiments of the method may include that the patches each comprise a plurality of pixels, and wherein the normalizing comprises dividing each of the plurality of pixels for each of the patches by a constant value.

In addition to one or more of the features described herein, or as an alternative, further embodiments of the method may include that the constant value is 65,535.

In addition to one or more of the features described herein, or as an alternative, further embodiments of the method may include, prior to creating the 2D slices from the plurality of CT voxel data sets, acquiring the CT voxel data sets.

In addition to one or more of the features described herein, or as an alternative, further embodiments of the method may include that the acquiring includes: emitting, by an x-ray source, x-rays towards an object; capturing, by a detector, the x-rays, wherein at least one of the x-rays passes through the object prior to being captured; and generating, based at least in part on the captured x-rays, the CT voxel data sets.

In addition to one or more of the features described herein, or as an alternative, further embodiments of the method may include that the detector comprises one of a scintillator unit, a photomultiplier tube, or a light receiving unit.

In addition to one or more of the features described herein, or as an alternative, further embodiments of the method may include, subsequent to training the autoencoder, performing, by the autoencoder, denoising of a CT image of an object.

In addition to one or more of the features described herein, or as an alternative, further embodiments of the method may include that the CT image is acquired by: emitting, by an x-ray source, x-rays towards the object; capturing, by a detector, the x-rays, wherein at least one of the x-rays passes through the object prior to being captured; and generating, based at least in part on the captured x-rays, the CT image of the object.

In addition to one or more of the features described herein, or as an alternative, further embodiments of the method may include that the object is a multi-material object.

In addition to one or more of the features described herein, or as an alternative, further embodiments of the method may include, subsequent to training the autoencoder, performing a surface determination on CT scan data.

In addition to one or more of the features described herein, or as an alternative, further embodiments of the method may include that the patches are overlapping patches.

In addition to one or more of the features described herein, or as an alternative, further embodiments of the method may include that the patches are non-overlapping patches.

In one exemplary embodiment, a method is provided. The method includes performing, by a computed tomography (CT) system, a CT scan of an object. The method further includes performing, by a processing system, CT reconstruction. The method further includes cutting, by the processing system, voxel data into a plurality of two-dimensional (2D) slices. The method further includes creating, by the processing system, patches from the 2D slices. The method further includes evaluating, by a trained autoencoder, the patches and generating output patches. The method further includes recombining, by the processing system, the output patches to 2D slices and the 2D slices to voxel data to generate a recombined output. The method further includes performing one of binarization or segmentation on the recombined output to create a mask. The method further includes applying, by the processing system, the mask to the CT scan data to generate masked CT data. The method further includes performing, by the processing system, a surface determination on the masked CT data.

In addition to one or more of the features described herein, or as an alternative, further embodiments of the method may include that performing the CT scan includes:

emitting, by an x-ray source, x-rays towards the object; capturing, by a detector, the x-rays, wherein at least one of the x-rays passes through the object prior to being captured; and generating, based at least in part on the captured x-rays, the CT image of the object.

In addition to one or more of the features described herein, or as an alternative, further embodiments of the method may include training the autoencoder.

In addition to one or more of the features described herein, or as an alternative, further embodiments of the method may include that training the autoencoder includes: creating 2D training slices from a plurality of CT voxel training data sets; adding artificial noise to the 2D training slices to generate artificially noisy 2D training slices; creating training patches from the 2D training slices and the artificially noisy 2D training slices; and training the autoencoder using the training patches.

In addition to one or more of the features described herein, or as an alternative, further embodiments of the method may include normalizing the patches.

In addition to one or more of the features described herein, or as an alternative, further embodiments of the method may include that the patches each comprise a plurality of pixels, and wherein the normalizing comprises dividing each of the plurality of pixels for each of the patches by a constant value.

In addition to one or more of the features described herein, or as an alternative, further embodiments of the method may include that the patches are overlapping patches.

In addition to one or more of the features described herein, or as an alternative, further embodiments of the method may include that the patches are non-overlapping patches.

In one exemplary embodiment, a method is provided. The method includes performing a first scan of an assembly to generate a first data set that is a combined computed tomography (CT) data set having artefacts, wherein the assembly is formed from a first material and a second material. The method further includes performing a second scan of the first material separately from the second material to generate a second data set for the first material. The method further includes generating a third data set for the second material from the first data set. The method further includes combining the second data set and the third data set to create an artificial multimaterial data set that is free of artefacts. The method further includes creating 2D slices from the first data set and the artificial multimaterial data set. The method further includes creating input patches from the 2D slices from the first data set and the artificial multimaterial data set. The method further includes normalizing the input patches. The method further includes training a machine learning model, using the input patches, to perform artefact removal.

In addition to one or more of the features described herein, or as an alternative, further embodiments of the method may include that the machine learning model is an autoencoder neural network.

In addition to one or more of the features described herein, or as an alternative, further embodiments of the method may include that the first material is plastic and wherein the second material is steel.

In addition to one or more of the features described herein, or as an alternative, further embodiments of the method may include that the second material has a higher density than the first material.

In addition to one or more of the features described herein, or as an alternative, further embodiments of the method may include normalizing gray values of the artificial multimaterial data set and aligning data of the artificial multimaterial data set to the first data set.

In one exemplary embodiment, a method is provided. The method includes training, using a first set of training data, a first machine learning model to remove noise from computed tomography (CT) voxel data sets. The method further includes training, using a second set of training data, a second machine learning model to perform artefact removal from the CT voxel data sets. The method further includes performing a scan of an assembly using a CT scanner to acquire CT scan data. The method further includes performing noise removal to remove noise from the CT scan data using the first machine learning model. The method further includes performing artefact removal to remove an artefact from the CT scan data using the second machine learning model.

In addition to one or more of the features described herein, or as an alternative, further embodiments of the method may include that training the first machine learning model to remove noise from the CT voxel data sets includes: creating two-dimensional (2D) slices from a plurality of computed tomography (CT) voxel data sets; adding artificial noise to the 2D slices to generate artificially noisy 2D slices; creating patches from the 2D slices and the artificially noisy 2D slices; and training the second machine learning model using the patches.

In addition to one or more of the features described herein, or as an alternative, further embodiments of the method may include that training the second machine learning model to remove artefacts from the CT voxel data sets includes: performing a first scan of an assembly to generate a first data set that is a combined computed tomography (CT) data set having artefacts, wherein the assembly is formed from a first material and a second material; performing a second scan of the first material separately from the second material to generate a second data set for the first material; generating a third data set for the second material from the first data set; combining the second data set and the third data set to create an artificial multimaterial data set that is free of artefacts; creating 2D slices from the first data set and the artificial multimaterial data set; creating input patches from the 2D slices from the first data set and the artificial multimaterial data set; normalizing the input patches; and training the second machine learning model, using the input patches, to perform artefact removal.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of embodiments of the invention are apparent from the following detailed description taken in conjunction with the accompanying drawings in which:

FIGS. 3A and 3B depict an autoencoder according to one or more embodiments described herein;

FIGS. 10A-10C depict examples of original scan data, artificially artefact-free data, and network output according to one or more embodiments described herein;

FIGS. 11A-11C depict examples of original scan data, artificially artefact-free data, and network output according to one or more embodiments described herein.

The detailed description explains embodiments of the disclosure, together with advantages and features, by way of example with reference to the drawings.

DETAILED DESCRIPTION

Embodiments of the present disclosure provide for a computed tomography (CT) system for segmentation of CT voxel data using a machine learning model, such as an autoencoder convolutional neural network. In one or more embodiments, multiple machine learning models can be implemented, such as to perform denoising and/or to perform artefact removal. Embodiments of the present disclosure provide for a CT system that provides advantages by using denoising and artefact removal using trained machine learning models to reduce reconstruction artefacts and noise in CT voxel data. According to one or more embodiments described herein, a machine learning model such as an autoencoder (i.e., an autoencoder convolutional neural network) can be trained to denoise CT data/images using real voxel data using pairs of images by artificially adding noise to one image of each of the pairs of images. According to one or more embodiments described herein, a machine learning model such as an autoencoder (i.e., an autoencoder convolutional neural network) can be trained using artefact-free training data such that the trained autoencoder can be used to remove artefacts from CT data/images.

Figure 1:
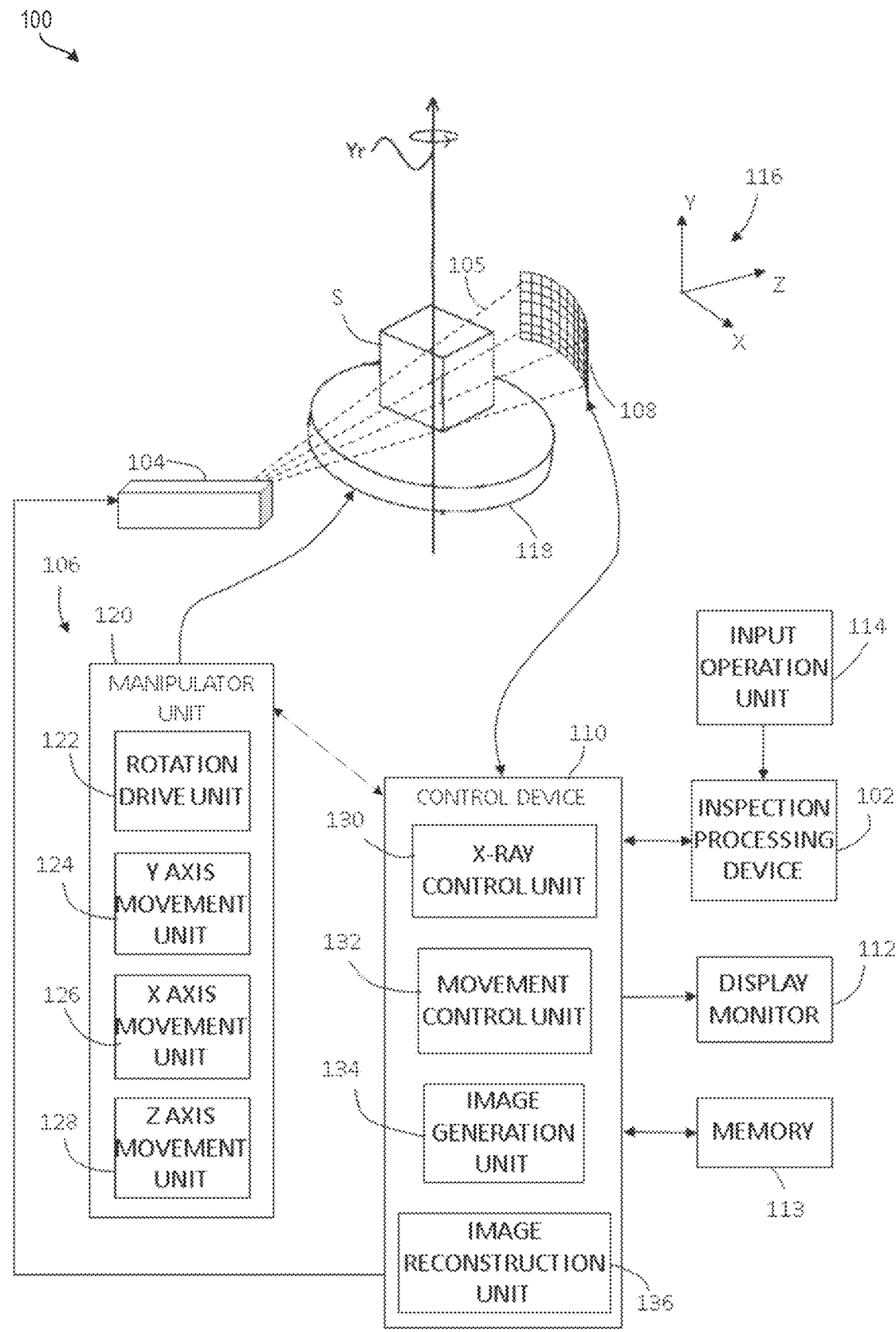
FIG. 1 depicts a schematic diagram of a computed tomography (CT) inspection system according to one or more embodiments described herein.
Figure 7A:
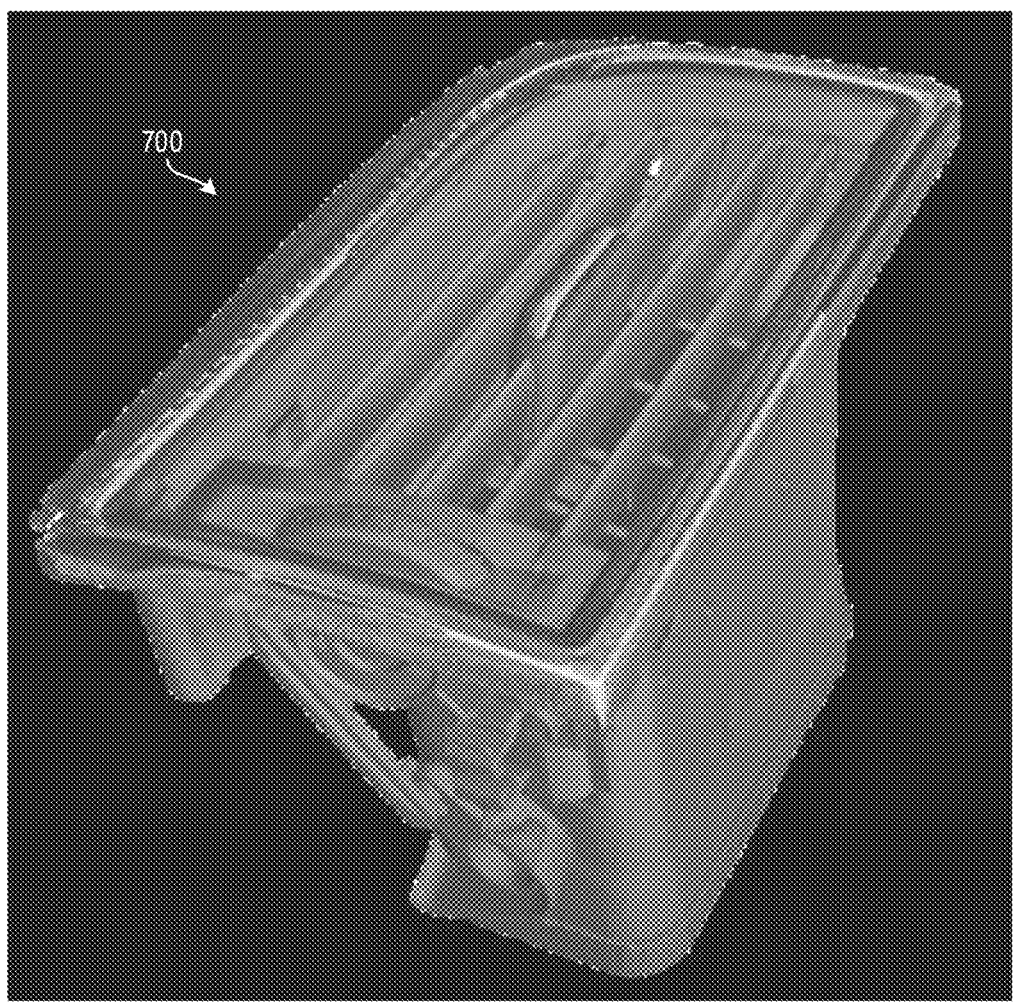
FIG. 7A depicts an example object according to one or more embodiments described herein.

Referring now to FIG. 1, an embodiment of a CT system 100 for inspecting objects (or "specimen"), such as the specimen S of FIG. 1 and/or the object 700 shown in FIG. 7A. It should be appreciated that while embodiments herein may illustrate or describe a particular type of CT system, this is for example purposes and the claims should not be so limited. In other embodiments, other types of CT systems having another trajectory, detector shape, or beam geometry, such as a fan-type or a cone-type CT system, for example, may also be used. The CT system 100 includes an inspection processing device 102, an x-ray source 104, a placement unit 106, a detector 108, a control device 110, a display 112, a memory 113 for storing computer-readable instructions and/or data, and an input operation unit 114. In an embodiment, the x-ray source 104 emits x-rays in a cone shape 105 in the Z direction in the coordinate frame of reference 116 along an optical axis from an emission point in accordance with control by the control device 110. The emission point corresponds to the focal point of the x-ray source 104. That is, the optical axis connects the emission point, which is the focal point of the x-ray source 104, with the center of the imaging capture region of the detector 108. It should be appreciated that the x-ray source 104, instead of one emitting x-rays in a cone shape, can also be one emitting x-rays in a fan-shape for example.

The placement unit 106 is provided with a placement stage 118 on which the specimen S (e.g., the object 700) is placed, and a manipulator unit 120. In an embodiment, the manipulator unit 120 includes a rotation device unit 122, an Y-axis movement unit 124, an X-axis movement unit 126, and a Z-axis movement unit 128. The placement stage 118 or the x-ray source 104 and detector 108 may be configured to be rotatable by the rotation drive unit 122.

The rotation drive unit 122 is, for example, configured by an electric motor or the like, is parallel to the Y-axis, and rotates the x-ray source 104 and detector 108 with an axis passing through the center of the placement stage 118. In an embodiment, the rotation drive unit 122 may be configured to rotate the placement stage 118, such as by an electronic motor, for example, to rotate the placement stage 118 about an axis passing through the center of the placement stage 118. The Y-axis movement unit 124, the X-axis movement unit 126, and the Z-axis movement unit 128 are controlled by the control device 110. The movement of the placement stage in the X-axis direction, the Y-axis direction, and the Z-axis direction are controlled by the control device 110 such that the specimen S is positioned in the emission range of the x-rays emitted by the x-ray source 104 and in the field of view of the detector 108. In an embodiment, the Z-axis movement unit 126 is controlled by the control device 110, and moves the placement stage 118 in the Z-axis direction so that the distance from the x-ray source 104 to the specimen S is a distance wherein the specimen S in the capture image is at the desired magnification ratio.

The detector 108 is provided on an opposite side of the placement stage 118 from the x-ray source 104. In an embodiment, the detector 108 is an area sensor, which has an incident surface extending along the XY plane. X-rays that pass through the specimen S on the placement stage 118 emitted from the x-ray source 104 are incident upon the incident surface of the detector 108. The detector 108 may include a scintillator unit, a photomultiplier tube, a light receiving unit, and the like as is known in the art. The scintillator unit converts the energy of the x-rays to light energy, such as visible light or ultraviolet light, amplifies it with the photomultiplier tube, converts the amplified light energy to electrical energy with the light receiving unit, and outputs it as an electrical signal to the control device 110.

It should be appreciated that the detector 108 described herein is for example purposes and other suitable type of detectors as is known in the art may be used. In other embodiments, for example, the detector 108 may be a one-dimensional line detector.

The x-ray source 104, the placement stage 118, and the detector 108 are supported by a frame (not shown). The frame is constructed having sufficient rigidity. Thus, it is possible to stably support the x-ray source 104, the placement stage 118, and detector 108 while acquiring a projected image of the specimen S. In an embodiment, the frame is supported by an anti-vibration mechanism (not shown) to prevent vibration generated on the outside from being transmitted to the frame.

The inspection processing device 102 receives an input from the input operation unit 114, which is configured by an input device (e.g. keyboard, various buttons, a mouse) and is used by the operator to control the operation of the CT system 100. The inspection processing device 102 causes the control device 110 to implement actions indicated by the input received by the input operation unit 114. The control device 110 is a microprocessor-based system that controls different modules of the CT system 100. The control device 110 includes an x-ray control unit 130, a movement control unit 132, an image generation unit 134, and an image reconstruction unit 136. The x-ray control unit 130 controls the operation of the x-ray source 104. The movement control unit 132 controls the movement of the manipulator unit 120. The image generation unit 134 generates x-ray projected image data for the specimen S based on an output signal from detector 108. The image reconstruction unit 136 performs image reconstruction processing that creates a reconstructed image based on the projector image data for specimen S from each different projection direction as is known in the art.

The reconstructed image is an image illustrating the structure of the interior and exterior of the specimen S (e.g., the object 700 of FIG. 7A) that is positioned in between the x-ray source 104 and the detector 108. In an embodiment, the reconstructed image is output as voxel data (also referred to as "CT voxel data"). The voxel data is an absorption coefficient distribution of the specimen S. According to one or more embodiments described herein, the CT system 100 can be a fan-type or a cone-type CT system. Using the CT system 100, three-dimensional shape information (e.g., the internal structure of the specimen S) may be generated by a surface model construction module (not shown) within the image reconstruction unit 136 based at least in part on the reconstructed image acquired at different positions in the Y-direction. In an embodiment, back projection, filtered back projection, and iterative reconstruction may be used in image reconstruction processing.

Metrology is the science of measurement. In order to perform metrology analyses on voxel data created by CT scanning (such as using the CT system 100), a surface needs to be determined from the voxel data. There are several conventional approaches typically used for finding the surface of an object from a voxel data set. Most of these approaches rely on the evaluation of either gray values of the voxels or gray value gradients, or both. On an ideal voxel data set, these conventional approaches work well enough. However, artefacts caused by the reconstruction of voxel data from 2D projection images and noise can alter the gray values and the gray value gradients locally such that conventional approaches are insufficient. Therefore, for CT voxel data that is affected by reconstruction artefacts and/or noise, no reliable, metrology-grade surface determination can be performed. This limits the application of CT scanning for metrology tasks and typically requires the use of more expensive and complex hardware to overcome the effect caused by artefacts.

In an effort to address these and other deficiencies of the prior art, one or more embodiments described herein perform segmentation of CT voxel data using a trained machine learning model, such as a trained autoencoder convolutional neural network(s). This approach reduces reconstruction artefacts and noise in CT voxel data. CT voxel data can then be binarized into material and background (for single material objects) or segmented into several materials of different density and background (for multi-material objects). This binarization or segmentation can then be used as a mask for the original CT voxel data to prepare it for surface determination for 3D metrology applications.

According to an example, voxel data of a sample to be inspected is created by a CT system (e.g., the CT system 100). The voxel data is then cut into 2D slices, and each slice is divided into patches, which may be overlapping or non-overlapping. These patches (overlapping patches or non-overlapping patches) are evaluated by a trained machine learning model, such as an autoencoder convolutional neural network, which is trained to recognize relevant information in input data, namely dominant shapes and contrasts. The trained machine learning model returns patches with the relevant information of the input patch without surrounding noise or artefacts. These patches are recombined to form a voxel data set that can be binarized or segmented and functions as a mask to preselect the areas in the original voxel data set that are relevant for surface determination. The surface determination is then performed on the masked original data.

The one or more embodiments described herein provide numerous technical advantages over the prior art. Further, the embodiments of the present invention facilitate improvements to computing technology, and particularly to techniques used for scanning an object using CT scanners and then evaluating the scanned data. For example, a CT system is disclosed that uses denoising based on a trained autoencoder convolutional neural network to reduce noise in CT voxel data. As another example, a CT system is disclosed that uses artefact removal based on a trained autoencoder convolutional neural network to reduce reconstruction artefacts in CT voxel data. In some examples, a CT system can perform both of denoising and artefact removal as described herein. In accordance with an embodiment, the present techniques provide for training machine learning models, such as autoencoder neural networks, to reduce reconstruction artefacts and noise in CT voxel data using pairs of images, where either one of the pair is modified by introducing artificial noise or one of the pair is an artificially created artefact-free multimaterial data set. Surface determination can be performed using masked original data that helps the algorithm focus on relevant information unperturbed by noise or artefacts. By removing the noise and artefacts, a surface determination is improved. More particularly, point clouds can be provided from CT scanning data with much higher accuracies and confidence levels. This improves computing technology and further represents a practical application that facilitates object evaluation, traceability of measurements, and measurements of multi-material parts when performing metrology CT techniques.

Figure 2:
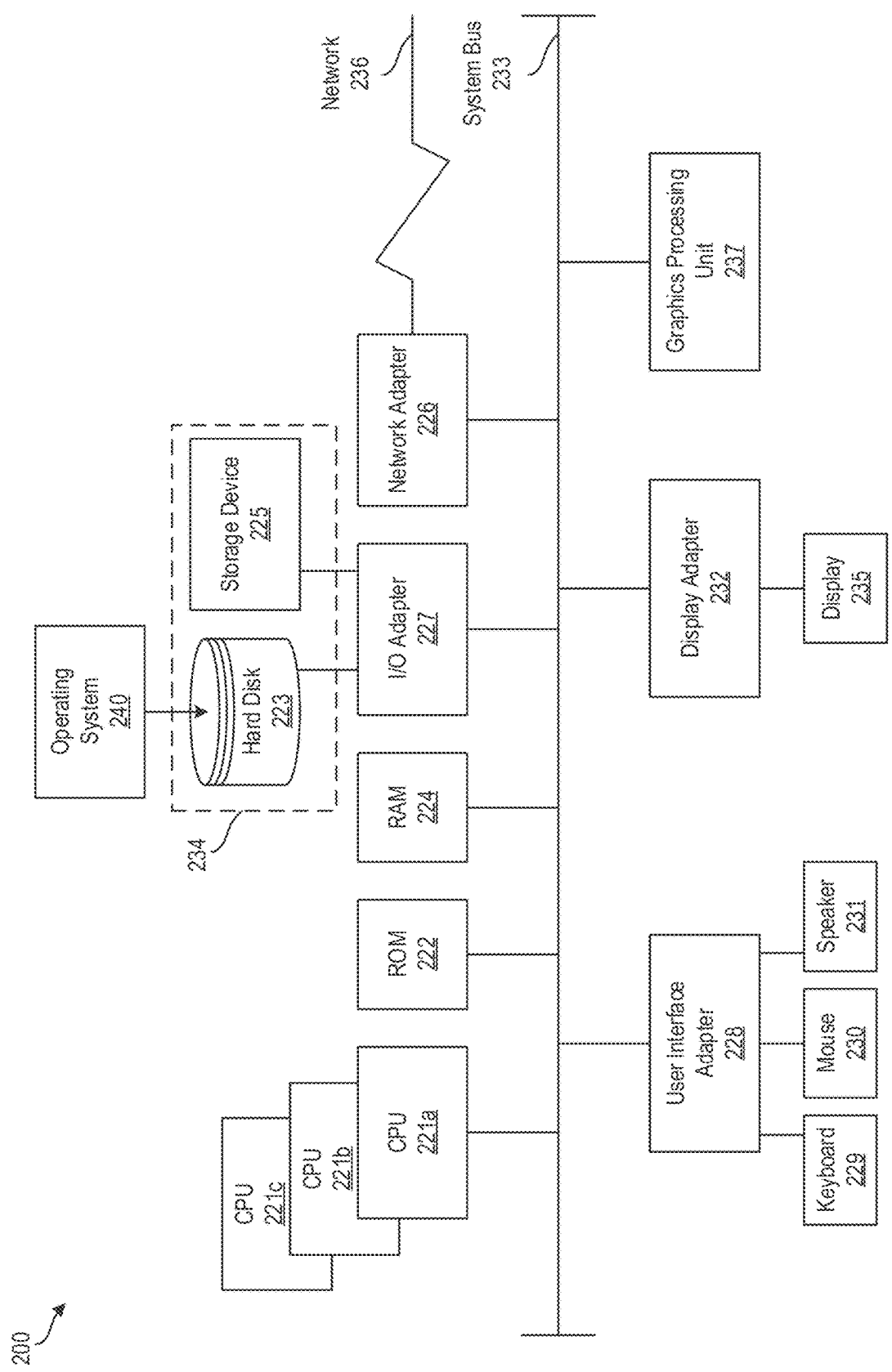
FIG. 2 depicts a computing device for performing the techniques according to one or more embodiments described herein.

It is understood that one or more embodiments described herein are capable of being implemented in conjunction with any other type of computing environment now known or later developed. For example, turning now to FIG. 2, a processing system 200 (i.e., a computing device) for performing the techniques described herein is depicted. For example, the processing system 200 can perform segmentation of CT voxel data using a trained machine learning model(s), such as a denoising autoencoder convolutional neural network and/or a trained artefact removal autoencoder convolutional neural network according to one or more embodiments described herein. Further, the processing system 200 can train one or more machine learning model(s) according to one or more embodiments described herein.

In examples, processing system 200 has one or more central processing units ("processors" or "processing resources") 221a, 221b, 221c, etc. (collectively or generically referred to as processor(s) 221 and/or as processing device(s)). In aspects of the present disclosure, each processor 221 can include a reduced instruction set computer (RISC) microprocessor. Processors 221 are coupled to system memory (e.g., random access memory (RAM) 224) and various other components via a system bus 233. Read only memory (ROM) 222 is coupled to system bus 233 and may include a basic input/output system (BIOS), which controls certain basic functions of processing system 200.

Further depicted are an input/output (I/O) adapter 227 and a network adapter 226 coupled to system bus 233. I/0 adapter 227 may be a small computer system interface (SCSI) adapter that communicates with a hard disk 223 and/or a storage device 225 or any other similar component. I/O adapter 227, hard disk 223, and storage device 225 are collectively referred to herein as mass storage 234. Operating system 240 for execution on processing system 200 may be stored in mass storage 234. The network adapter 226 interconnects system bus 233 with an outside network 236 enabling processing system 200 to communicate with other such systems.

A display (e.g., a display monitor) 235 is connected to system bus 233 by display adapter 232, which may include a graphics adapter to improve the performance of graphics intensive applications and a video controller. In one aspect of the present disclosure, adapters 226, 227, and/or 232 may be connected to one or more I/0 busses that are connected to system bus 233 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 233 via user interface adapter 228 and display adapter 232. A keyboard 229, mouse 230, and speaker 231 may be interconnected to system bus 233 via user interface adapter 228, which may include, for example, a Super I/O chip integrating multiple device adapters into a single integrated circuit.

In some aspects of the present disclosure, processing system 200 includes a graphics processing unit 237. Graphics processing unit 237 is a specialized electronic circuit designed to manipulate and alter memory to accelerate the creation of images in a frame buffer intended for output to a display. In general, graphics processing unit 237 is very efficient at manipulating computer graphics and image processing, and has a highly parallel structure that makes it more effective than general-purpose CPUs for algorithms where processing of large blocks of data is done in parallel.

Thus, as configured herein, processing system 200 includes processing capability in the form of processors 221, storage capability including system memory (e.g., RAM 224), and mass storage 234, input means such as keyboard 229 and mouse 230, and output capability including speaker 231 and display 235. In some aspects of the present disclosure, a portion of system memory (e.g., RAM 224) and mass storage 234 collectively store the operating system 240 to coordinate the functions of the various components shown in processing system 200.

As described herein, a neural network can be trained to denoise images and/or remove artefacts, which is useful for performing segmentation of CT voxel data. More specifically, the present techniques can incorporate and utilize rule-based decision making and artificial intelligence (AI) reasoning to accomplish the various operations described herein, namely denoising images or artefact removal on images, such as CT images. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting model can be used for performing segmentation of CT voxel data. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANN that are particularly useful at analyzing visual imagery.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read. It should be appreciated that these same techniques can be applied in the case of denoising images or removing artefacts, which is useful for performing segmentation of CT voxel data.

FIGS. 3A and 3B depict an autoencoder 302 that implements machine learning according to one or more embodiments described herein. It should be appreciated that other architectures can be used to implement the machine learning features and functionality described herein in accordance with other embodiments. As shown in FIG. 3A, the autoencoder 302 receives an image 301, which can be a noisy image and/or an image with artefacts, as an input and produces a clean image 303 as an output. An autoencoder, such as the autoencoder 302, uses a neural network that learns in an unsupervised way. Autoencoders can be used in a variety of applications, such as dimensionality reduction, anomaly detection, denoising, etc. According to one or more embodiments described herein, the autoencoder 302 can be trained to recognize certain information in input data (e.g., the image 301, which can be a noisy image and/or image with artefacts). As one example, an autoencoder can be trained to recognize real information, such as handwriting, in a noisy image and to produce the recognized information without surrounding noise as a clean image (e.g., the clean image 303). In examples, the output is a binarized image or an image that is capable of being binarized. An autoencoder can be trained to find real information in images with different segments with different gray value levels and process this segment information.

FIG. 3B depicts the autoencoder 302 in more detail. In this example, the autoencoder 302 includes an encoder 310 that receives the image 301 (e.g., a noisy image or an image with artefacts) and a decoder 320 that produces the clean image 302. The encoder 310 includes an input layer 311 (labeled as "X"), and the decoder 320 includes an output layer 321 (labeled as "X"). The input layers 311 and the output layer 321 use an activation function, which may be non-linear. An example of an activation function is a rectified linear unit (ReLU). Each of the encoder 310 and the decoder 320 utilizes code 330 (labeled as "h") in a latent space between the input layer 311 and the output layer 321 to perform denoising.

Figure 4:
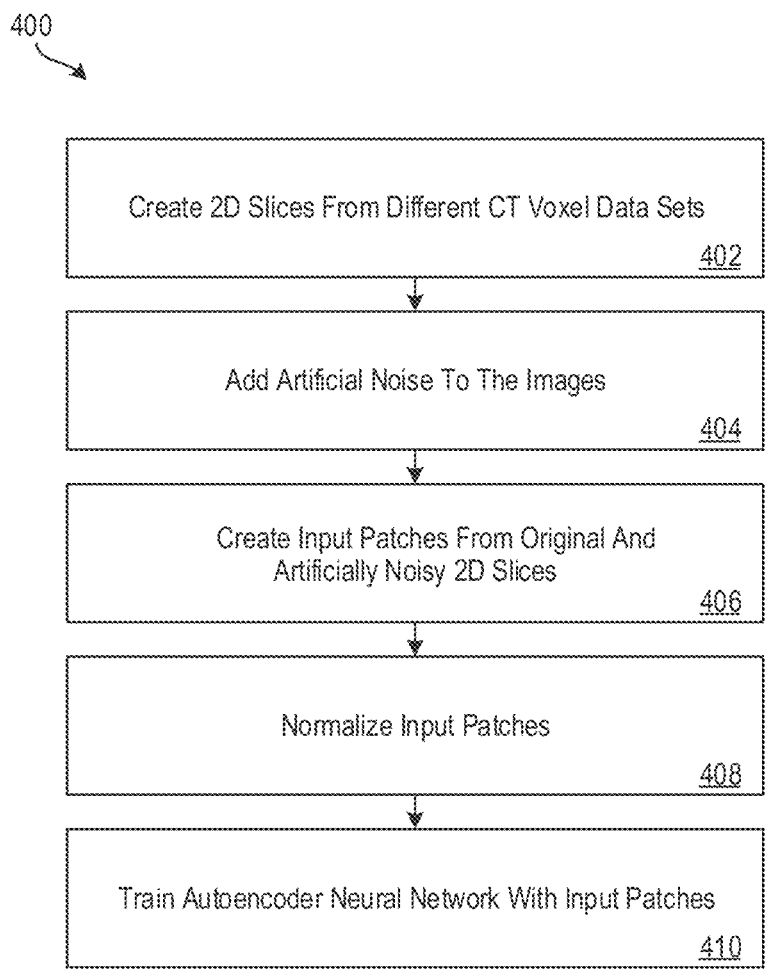
FIG. 4 depicts a flow diagram of a method for training a machine learning model for image denoising according to one or more embodiments described herein.

FIG. 4 depicts a flow diagram of a method 400 for training a machine learning model for denoising a CT image according to one or more embodiments described herein. The method 400 can be performed by any suitable processing system or device, such as the computing device 110, to train a machine learning model, such as the autoencoder 302.

Figure 5A:
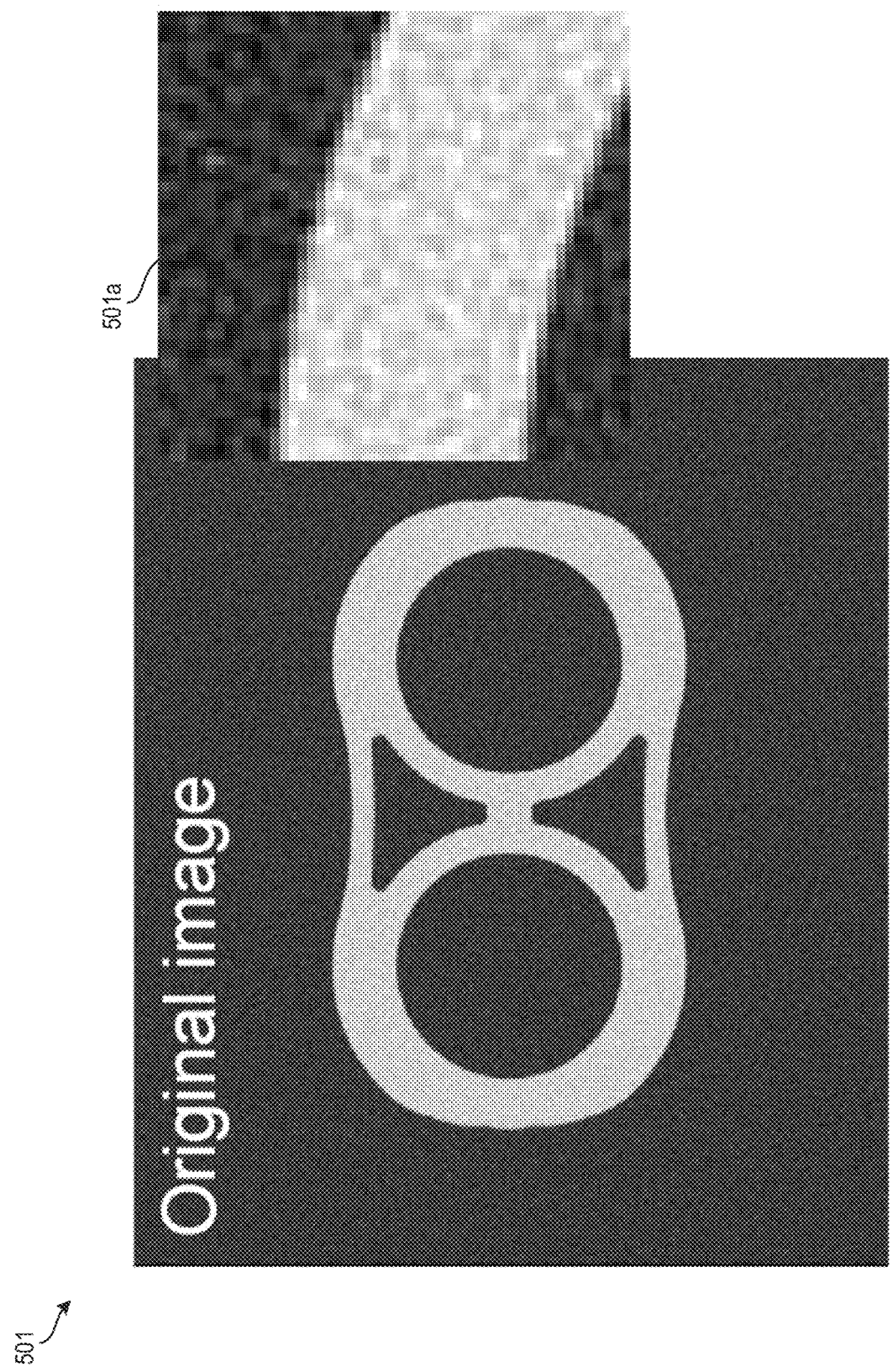
FIG. 5A depicts an example original image according to one or more embodiments described herein.

At block 402, two-dimensional (2D) images (slices) are created from different CT voxel data sets. For example, these images (slices) (referred to also as the "original images") can be 2D 16-bit tiff grayscale images (slices). FIG. 5A depicts an example original image 501 according to one or more embodiments described herein. The original images can be taken from CT scans of one or more objects (such as the object 700 of FIG. 7A) performed by a CT system (such as the CT system 100 of FIG. 1). In this way, the original images act as training data to train a machine learning model (such as the autoencoder 302).

Figure 5B:
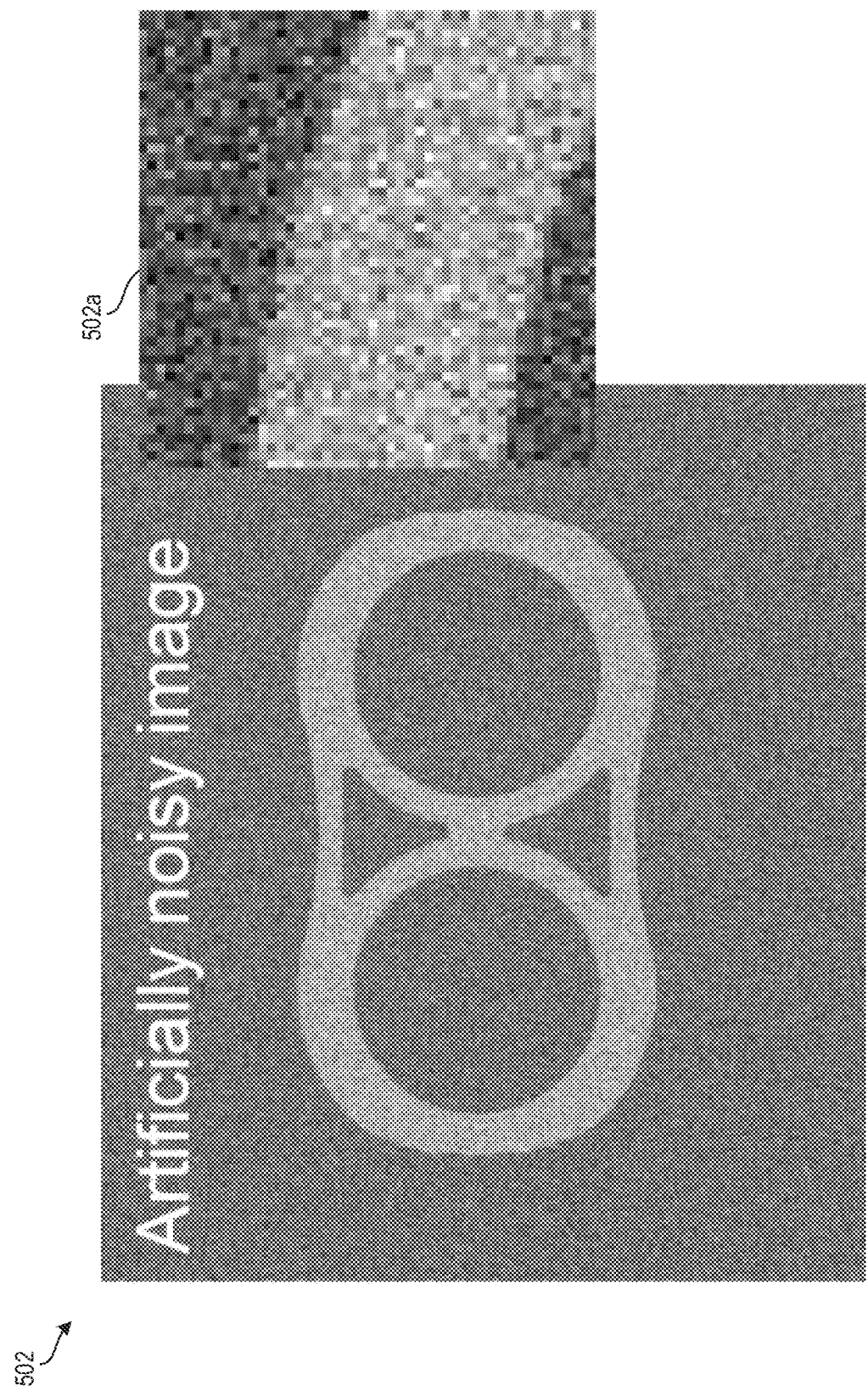
FIG. 5B depicts an example artificially noisy image according to one or more embodiments described herein.

With continued reference to FIG. 4, at block 404, artificial noise is added to the 2D images (slices). FIG. 5B depicts an example artificially noisy image 502 according to one or more embodiments described herein. That is, noise is added to the original image 501 to generate the artificially noisy image 502. The added noise can be seen in more detail from the portion 502a as compared to the portion 501a from FIG. 5A.

Figure 5C:
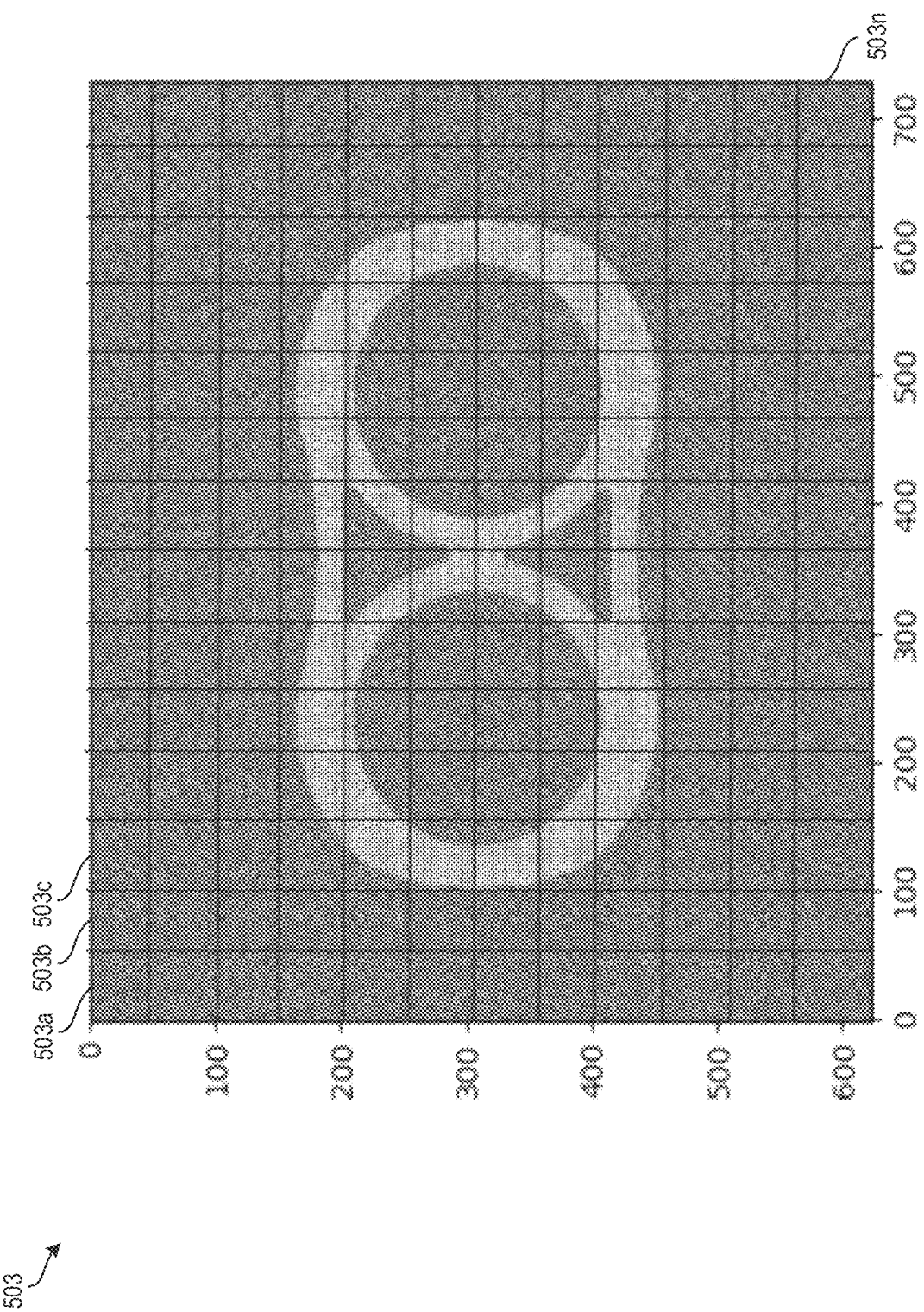
FIG. 5C depicts an image having (non-overlapping) patches according to one or more embodiments described herein.

With continued reference to FIG. 4, at block 406, input patches (referred to also as simply "patches" and which can be overlapping patches or non-overlapping patches) are created from the original CT voxel data sets and the artificially noisy 2D images (slices). FIG. 5C depicts an image 503 having (non-overlapping) patches 503a, 503b, 503c . . . 503n according to one or more embodiments described herein.

With continued reference to FIG. 4, it should be appreciated that, in some examples, it is possible to create patches first (i.e., to perform block 406) and to add noise to each patch separately (i.e., to perform block 404)

At block 408, the patches are normalized. This can be performed by dividing every pixel by a constant value, (e.g., 65,535), for example. In some examples, the constant value is selected based on a maximum gray value based on a bit size of the CT voxel data sets. For example, for 16-bit tiff grayscale images, the maximum grayscale value is 65,535. Other normalization techniques can also be applied.

At block 410, machine learning model (e.g., the autoencoder 302) is trained with the patches. In some examples, the training is performed on a graphics processing unit (GPU) or other suitable hardware devices. The training can occur, for example, for approximately 120-300 epochs (training cycles), although the training is not so limited. Once the autoencoder 302 is trained, the machine learning model can be used to perform segmentation of CT voxel data. One example of using the machine learning model to perform the segmentation is depicted in FIG. 6 and described in more detail herein.

Additional processes also may be included, and it should be understood that the process depicted in FIG. 4 represents an illustration and that other processes may be added or existing processes may be removed, modified, or rearranged without departing from the scope of the present disclosure.

Figure 6:
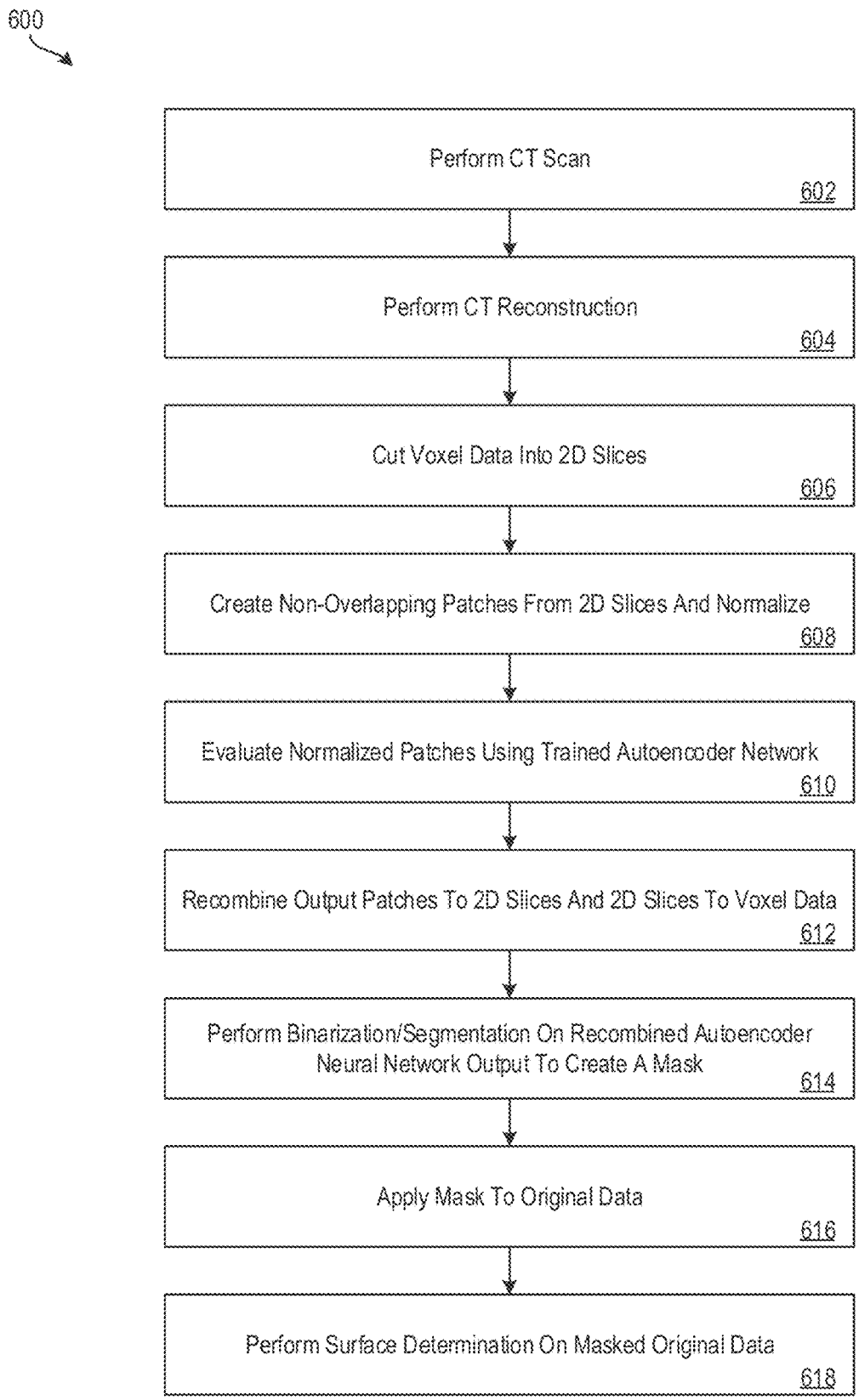
FIG. 6 depicts a flow diagram of a method for segmentation of CT voxel data using a trained machine learning model according to one or more embodiments described herein.

Turning now to FIG. 6, a flow diagram of a method 600 is depicted for segmentation of CT voxel data using a trained machine learning model, such as a autoencoder convolutional neural network, according to one or more embodiments described herein. It should be appreciated that the trained machine learning model (e.g., the trained autoencoder convolutional neural network) can be trained to remove noise from images and/or to remove artefacts from images as described herein with reference to FIG. 10. The method 600 can be performed by the CT system 100 of FIG. 1 and/or by any suitable processing system or device, such as the processing system 200 of FIG. 200. In some examples, one or more blocks of the method 600 can be performed by or with an autoencoder, such as the autoencoder 302 of FIGS. 3A and 3B.

Figure 7B:
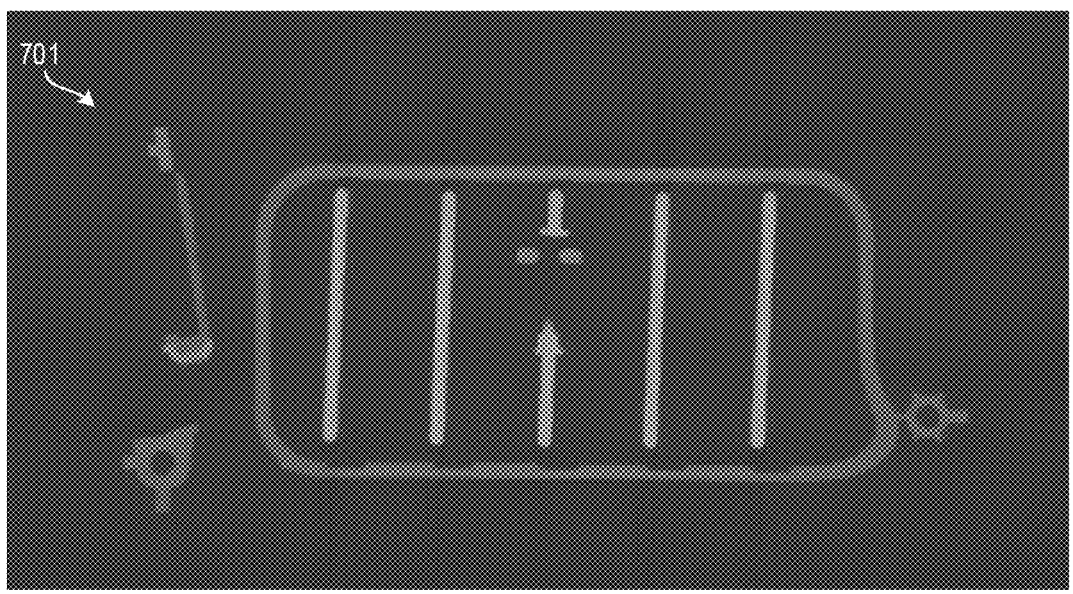
FIG. 7B depicts an example slice of reconstructed voxel data according to one or more embodiments described herein.

At block 602, the CT system 100 performs a CT scan to create 2D x-ray projection images. For example, the CT system 100 scans the object 700 of FIG. 7A and creates 2D x-ray projection images. In some examples, the object 700 is a single-material object (made from a single material) while in other examples, the object 700 is a multi-material object (made from two or more different materials). An example slice 701 of the reconstructed voxel data is depicted in FIG. 7B according to one or more embodiments described herein.

With continued reference to FIG. 6, at block 604, the computing device reconstructs voxel data from the 2D x-ray projection images from block 602. At block 606, the computing device cuts the voxel data into 2D slices.

At block 608, the computing device creates patches (see, e.g., FIG. 5B), which may be overlapping patches or non-overlapping patches, from the 2D slices at block 606 and performs normalization. The patches can have a size based on a size of network patches and can be different sizes in different examples. As one such example, a patch can be 52 pixels by 52 pixels, although other sizes are possible. Normalization can be performed by dividing every pixel by a constant value, (e.g., 65,535). Other normalization techniques can also be performed.

At block 610, the autoencoder 302 evaluates the normalized (overlapping or non-overlapping) patches. To perform the evaluation, the autoencoder 302 receives as input the normalized (overlapping or non-overlapping) patches and evaluates the input to generate patches that have been denoised and/or had artefacts removed using the autoencoder 302. This process eliminates noise/artefacts.

Figure 8B:
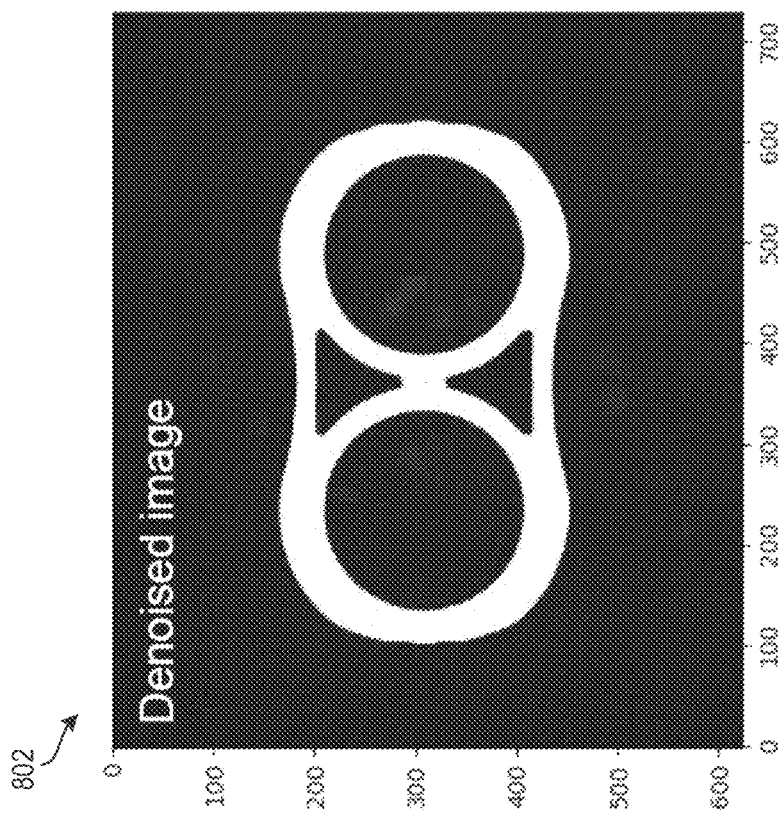
FIG. 8B depicts an example denoised image generated from the artificially noisy image of FIG. 8A according to one or more embodiments described herein.
Figure 8A:
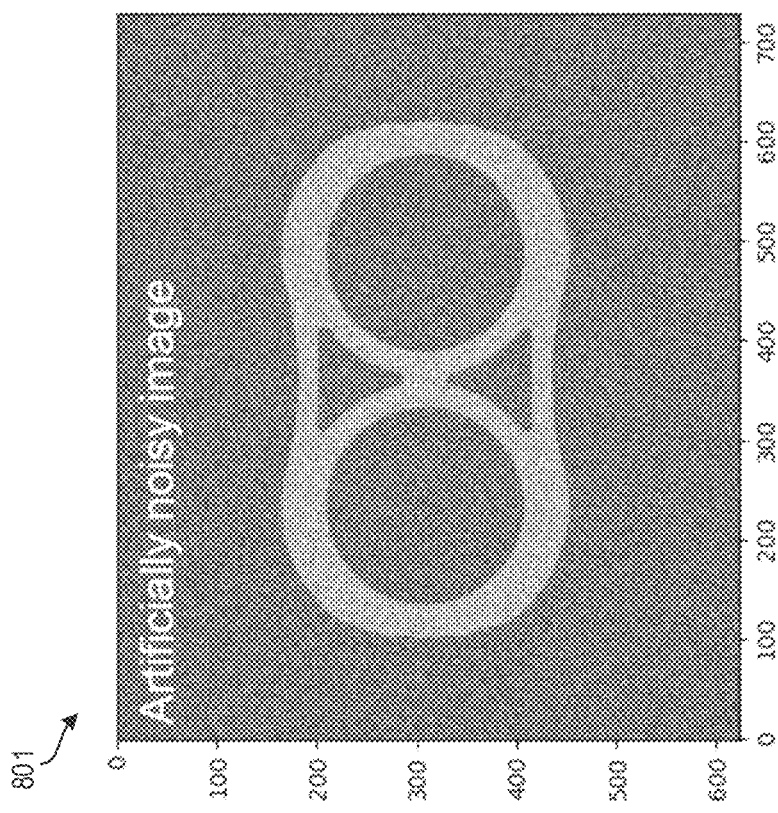
FIG. 8A depicts an example artificially noisy image according to one or more embodiments described herein.

For denoising, the autoencoder 302 is trained by introducing artificial noise to one of a pair of images, as described with reference to FIG. 4. For example, FIG. 8A depicts an example artificially noisy image 801 according to one or more embodiments described herein, and FIG. 8B depicts an example denoised image 802 generated from the artificially noisy image of FIG. 8A according to one or more embodiments described herein. According to one or more embodiments described herein, training the autoencoder 302 for denoising includes: creating 2D training slices from a plurality of CT voxel training data sets; adding artificial noise to the 2D training slices to generate artificially noisy 2D training slices; creating training patches from the 2D training slices and the artificially noisy 2D training slices; and training the autoencoder using the training patches.

Figure 9:
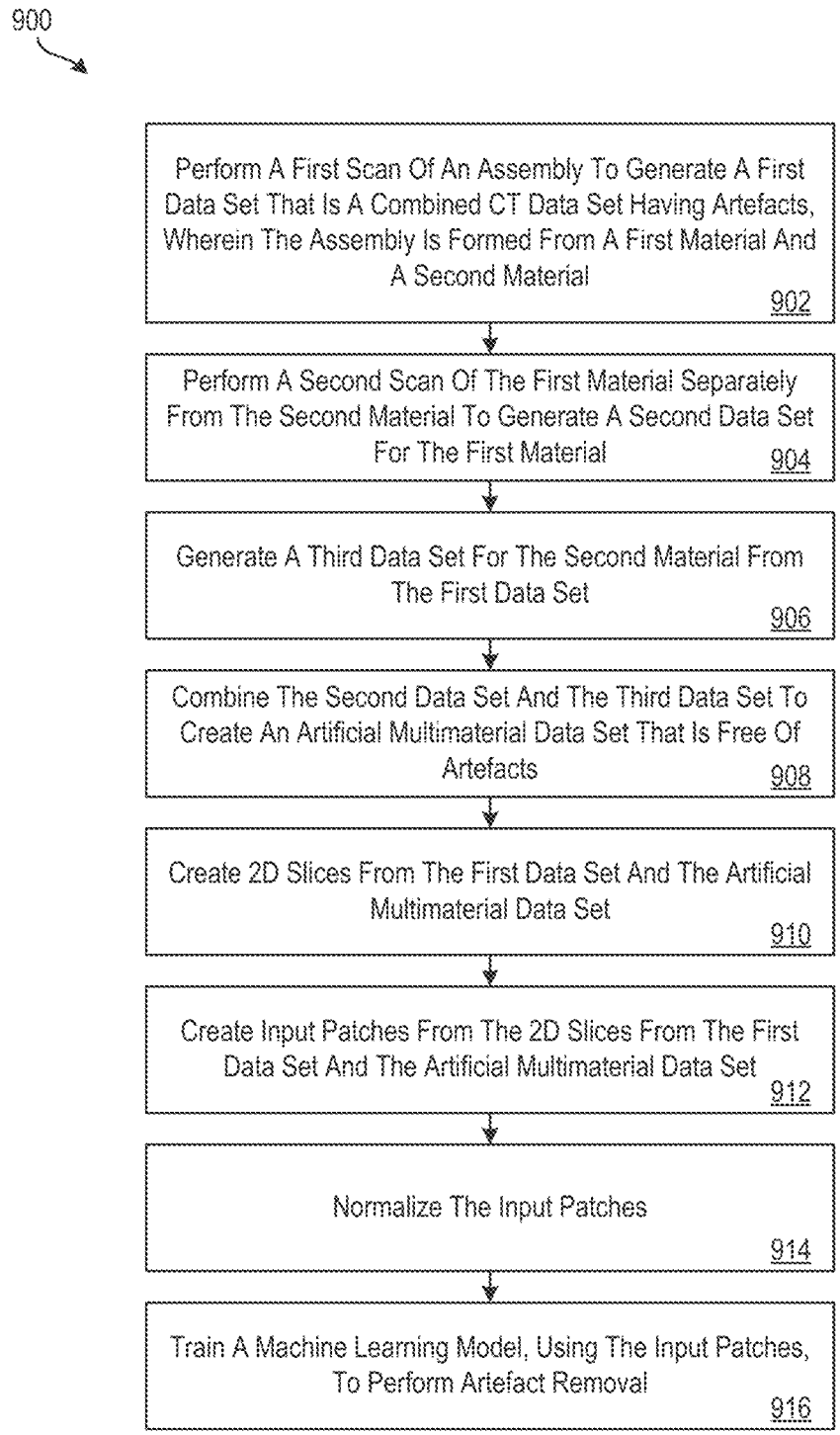
FIG. 9 depicts a flow diagram of a method for training a machine learning model for artefact removal according to one or more embodiments described herein.

For artefact removal, the autoencoder 302 is trained by using artificially artefact-free data sets matching the original scan data used for training (see, e.g., FIGS. 10A-10C, 11A-11C, and 12A-12C), as described herein with reference to FIG. 9. According to one or more embodiments described herein, training the autoencoder 302 for artefact removal includes: performing a first scan of an assembly to generate a first data set that is a combined computed tomography (CT) data set having artefacts; performing a second scan of the first material (which has a lower density/lower x-ray absorption compared to the second material) separately from the second material to generate a second data set for the first material; generating a third data set for the second material from the first data set; normalizing the second data set and the third data set to match gray values of the first data set; combining the second data set and the third data set to create an artificial multimaterial data set that is free of artefacts; aligning the second data set and the third data set (e.g., aligning the position, orientation, and/or dimensions of the data sets); creating 2D slices from the first data set and the artificial multimaterial data set; creating input patches from the 2D slices from the first data set and the artificial multimaterial data set; normalizing the input patches; and training the second machine learning model (e.g., the autoencoder 302), using the input patches, to perform artefact removal.

With continued reference to FIG. 6, at block 612, the computing device recombines the output patches from the autoencoder 302 to 2D slices and 2D slices to 3D voxel data. At block 614, the computing device performs binarization/segmentation on the recombined autoencoder neural network output from block 612 to create a mask. At block 616, the computing device applies the mask as a filter to the original data. In examples, each of the patches are run through the autoencoder network for evaluation at the same time, creating one denoised 3D voxel data volume, which is used to create one 3D mask for the full data set. To create the mask, each region is labeled by its gray value in the denoised data. Each of the regions are then dilated that are not background (typically labeled "0") to also cover the regions around the different materials and set them to 1s, thus creating the mask. To apply the mask in the case of single material data sets, which can be separated into two segments, a binary 3D array of 0s and 1s is generated and is multiplied against the original data. For multi-material data sets, segmentation occurs in more classes. For example, for a two-material example, the 3D array includes 0s, 1s, and 2s, which is generated and multiplied against the original data. For example, if the original data is multiplied by two, an overflow may occur since the data is in 16-bit units. In such cases, one mask each per material can be created. For creating the mask for one material, this material would be labelled by one and all other regions with zero. Surface determination would then run for each material individually. The 3D array can change based on how many materials are used, for example. The mask is used to mark candidates for surface points in the original data set. These candidates might still contain noise or artefacts. However, the procedure helps to identify the surface despite the presence of noise and/or artefacts. At block 618, the computing device performs a surface determination on the masked original data to determine a surface of the object (e.g., the object 700) that is scanned using the CT system 100 or another suitable system/device.

Additional processes also may be included, and it should be understood that the process depicted in FIG. 6 represents an illustration and that other processes may be added or existing processes may be removed, modified, or rearranged without departing from the scope of the present disclosure.

FIG. 9 depicts a method 900 for training an autoencoder neural network for artefact removal according to one or more embodiments described herein. The method 900 can be performed by any suitable processing system or device, such as the computing device 110, to train an autoencoder, such as the autoencoder 302. The method 900 is now described with reference to FIGS. 10A-10C, 11A-11C, and 12A-12C, which depict examples of original scan data, artificially artefact-free data, and network output according to one or more embodiments described herein. In the examples of FIGS. 10A-10C and 12A-12C, multiple materials are used (e.g., a first material and a second material) as described herein. However, in the example of FIGS. 11A-11C, a multimaterial part is used, but the slices that are shown depict a single material with the second material being visible by the artefact. As can be seen, the original scan data 1100 of FIG. 11A includes an artefact, which is subsequently removed using the techniques described herein.

Figure 12A:
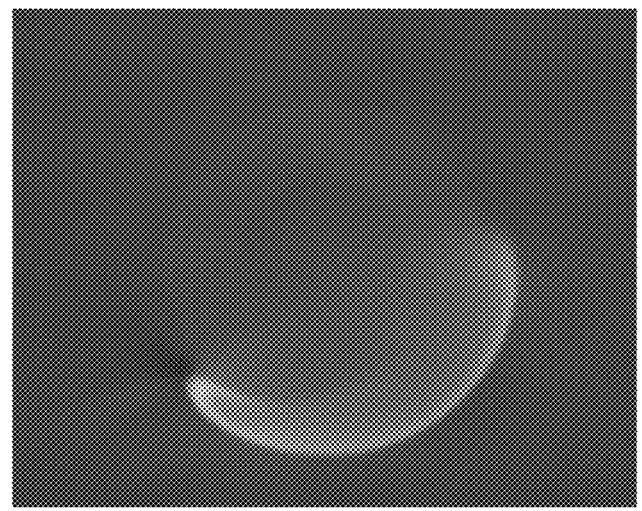
FIGS. 12A-12C depict examples of original scan data, artificially artefact-free data, and network output according to one or more embodiments described herein.

At block 902, a first scan of an assembly is performed (e.g., using the CT system 100) to generate a first data set that is a combined computed tomography (CT) data set having artefacts, wherein the assembly is formed from a first material and a second material. For example, the first material could be plastic (e.g., a relatively lower density material) and the second material could be steel (e.g., a relatively higher density material). It should be appreciated that other materials can be used. In the case of plastic and steel, these two materials have different densities. Particularly, the steel (i.e., the second material) has a much higher density than the plastic (i.e., the first material) and thus can cause artefacts to be present in CT images generated during a scan. This often occurs where a plastic or foam fixture is used to support an object to be scanned within an enclosure of the CT system 100. As an example, FIG. 10A depicts an original scan data image 1000 (e.g., the first data set). As another example, FIG. 11A depicts an original scan data image 1100 (e.g., the first data set). As yet another example, FIG. 12A depicts an original scan data image 1200 (e.g., the first data set).

At block 904, a second scan of the first material is performed (e.g., using the CT system 100) separately from the second material to generate a second data set for the first material. For example, where a plastic or foam fixture is used to scan a target object, the fixture (being of the first material) is scanned separately from the target object (being of the second material). The resulting data set from the second scan is of the first material only and not the second material according to one or more embodiments described herein.

At block 906, a third data set is generated for the second material from the first data set. This can be achieved by scanning the second material separately from the first material according to one or more embodiments described herein. However, in other embodiments, the third data set can be generated by removing data contained in the second data set from the first data set. That is, a subtraction is performed, leaving the scan data for the second material without the scan data for the first material. In yet another embodiment, a rough surface determination is performed for the high-density material, which can be performed using thresholding. Then, everything within this surface is extracted as a new data set. In this example, the unwanted data are not removed per se; rather, the desired data are extracted as the new data set.

Figure 12B:

At block 908, the second data set and the third data set are combined to create an artificial multimaterial data set that is free of artefacts. According to one or more embodiments described herein, before the second and third data sets are combined, the second and third data sets are normalized to match the gray values of the first data set. By combining the second data set and the third data set, a clean data set is created that is free of artefacts while containing the other relevant data from the first material and the second material. As an example, FIG. 10B depicts an artificially artefact-free data image 1001 (e.g., the artificial multimaterial data set). As another example, FIG. 11B depicts an artificially artefact-free data image 1101 (e.g., the artificial multimaterial data set). As yet another example, FIG. 12B depicts an artificially artefact-free data image 1201 (e.g., the artificial multimaterial data set). According to one or more embodiments described herein, the combining includes aligning the second data set and/or the third data set to the first data set so that the clean data set has the same dimensions as the first data set and that the orientation of the materials is the same across the data sets.

At block 910, 2D slices are created from the first data set and the artificial multimaterial data set. The slices are created as described herein (see, e.g., block 406 of FIG. 4). At block 912, input patches are created from the 2D slices from the first data set and the artificial multimaterial data set. The input patches are created as described herein (see, e.g., block 408 of FIG. 4). At block 914, the input patches are normalized as described herein.

Figure 12C:
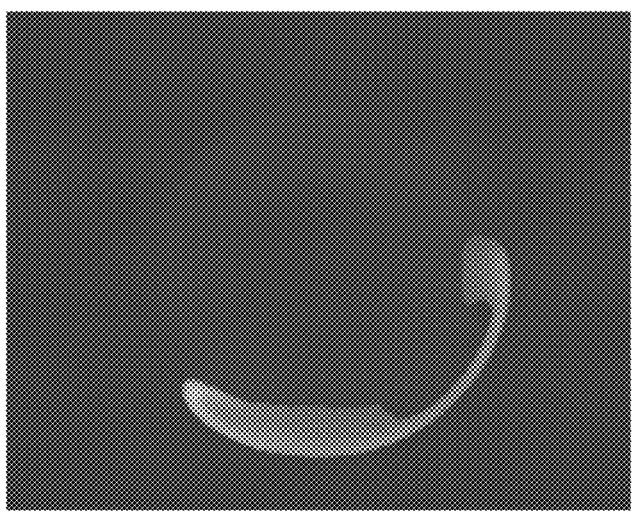

At block 916, a machine learning model (e.g., the autoencoder 302) is trained, using the input patches, to perform artefact removal. For example, the input patches are fed into the autoencoder 302 as the input images 301, and the autoencoder is trained to generate clean images 303 that do not contain artefacts. The training input to the autoencoder 302 includes the patches free from artefacts (from the artificial multimaterial data set) as well as the non-clean images from the first scan. Using these inputs, the autoencoder is trained to identify and remove artefacts from CT images. In some examples, the training is performed on a graphics processing unit (GPU) or other suitable hardware devices. The training can occur, for example, for approximately 120-300 epochs (training cycles), although the training is not so limited. Once the autoencoder 302 is trained, the machine learning model can be used to perform segmentation of CT voxel data. One example of using the machine learning model to perform the segmentation is depicted in FIG. 6 and described in more detail herein. As an example, FIG. 10C depicts a network output image 1002 (e.g., an output of the autoencoder 302). As another example, FIG. 11C depicts a network output image 1101 (e.g., an output of the autoencoder 302). As yet another example, FIG. 12C depicts a network output image 1201 (e.g., an output of the autoencoder 302).

Additional processes also may be included, and it should be understood that the process depicted in FIG. 9 represents an illustration and that other processes may be added or existing processes may be removed, modified, or rearranged without departing from the scope of the present disclosure.

Terms such as processor, controller, computer, DSP, FPGA are understood in this document to mean a computing device that may be located within an instrument, distributed in multiple elements throughout an instrument, or placed external to an instrument.

While embodiments of the invention have been described in detail in connection with only a limited number of embodiments, it should be readily understood that the invention is not limited to such disclosed embodiments. Rather, the embodiments of the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the embodiments of the invention are not to be seen as limited by the foregoing description but is only limited by the scope of the appended claims.

What is claimed is:

1. A method comprising:
    training, using a first set of training data, a first machine learning model to remove noise from computed tomography (CT) voxel data sets, wherein training the first machine learning model to remove noise from the CT voxel data sets comprises: creating first two-dimensional (2D) slices from a plurality of computed tomography (CT) voxel data sets; adding artificial noise to the first 2D slices to generate artificially noisy 2D slices; creating first input patches from the first 2D slices and the artificially noisy 2D slices; and training the first machine learning model using the first input patches;
    performing a first scan of a first assembly to generate a first data set that is a combined computed tomography (CT) data set having artefacts, wherein the assembly is formed from a first material and a second material;
    performing a second scan of the first material separately from the second material to generate a second data set for the first material;
    generating a third data set for the second material from the first data set;
    combining the second data set and the third data set to create an artificial multimaterial data set that is free of artefacts;
    creating second two-dimensional (2D) slices from the first data set and the artificial multimaterial data set;
    creating second input patches from the second 2D slices created from the first data set and the artificial multimaterial data set;
    normalizing the second input patches;
    training, using the second input patches, a second machine learning model to perform artefact removal from the CT voxel data sets;
    performing a third scan of a second assembly using a CT scanner to acquire CT scan data;

performing noise removal to remove noise from the CT scan data using the first machine learning model; and performing artefact removal to remove an artefact from the CT scan data using the second machine learning model.

2. The method of claim 1, further comprising, prior to creating the first 2D slices from the plurality of CT voxel data sets, acquiring the CT voxel data sets.

3. The method of claim 2, wherein the acquiring comprises:

emitting, by an x-ray source, x-rays towards an object;

capturing, by a detector, the x-rays, wherein at least one of the x-rays passes through the object prior to being captured; and generating, based at least in part on the captured x-rays, the plurality of CT voxel data sets.

4. The method of claim 3, wherein the detector comprises one of a scintillator unit, a photomultiplier tube, or a light receiving unit.

5. The method of claim 3, wherein the object is a multi-material object.

6. The method of claim 1, further comprising, subsequent to training the first machine learning model, performing a surface determination on the CT scan data.

7. The method of claim 1, wherein the first input patches from the first 2D slices and the artificially noisy 2D slices are overlapping patches.

8. The method of claim 1, wherein the patches from the 2D slices and the artificially noisy 2D slices are non-overlapping patches.

9. A method for removing an artefact from an image, the method comprising:

performing a first scan of an assembly to generate a first data set that is a combined computed tomography (CT) data set having artefacts, wherein the assembly is formed from a first material and a second material;

performing a second scan of the first material separately from the second material to generate a second data set for the first material;

generating a third data set for the second material from the first data set;

combining the second data set and the third data set to create an artificial multimaterial data set that is free of artefacts;

creating two-dimensional (2D) slices from the first data set and the artificial multimaterial data set;

creating input patches from the 2D slices from the first data set and the artificial multimaterial data set;

normalizing the input patches; and training a machine learning model, using the input patches, to perform artefact removal.

10. The method of claim 9, wherein the machine learning model is an autoencoder neural network.

11. The method of claim 9, wherein the first material is plastic and wherein the second material is steel.

12. The method of claim 9, wherein the second material has a higher density than the first material.

13. The method of claim 9, further comprising:

normalizing gray values of the artificial multimaterial data set; and aligning data of the artificial multimaterial data set to the first data set.

14. The method of claim 9, wherein performing the first scan comprises:

emitting, by an x-ray source, x-rays towards the assembly;

capturing, by a detector, the x-rays, wherein at least one of the x-rays passes through the assembly prior to being captured; and generating, based at least in part on the captured x-rays, a CT image of the assembly.

15. The method of claim 9, wherein each of the input patches comprises a plurality of pixels, and wherein the normalizing comprises dividing each of the plurality of pixels for each of the input patches by a constant value.

16. The method of claim 9, wherein the input patches are overlapping patches.

17. The method of claim 9, wherein the input patches are non-overlapping patches.

18. The method of claim 15, wherein the constant value is 65,535.

* * * * *